US007761327B1

(12) United States Patent
Hannah et al.

(10) Patent No.: US 7,761,327 B1
(45) Date of Patent: Jul. 20, 2010

(54) ENSURING THAT ADVERTISEMENTS ARE PLAYED

(75) Inventors: Eric C. Hannah, Pebble Beach, CA (US); Michael Boyd, Lakeport, CA (US)

(73) Assignee: Intel Corporation, Santa Clara, CA (US)

( * ) Notice: Subject to any disclaimer, the term of this patent is extended or adjusted under 35 U.S.C. 154(b) by 2453 days.

(21) Appl. No.: 09/690,512

(22) Filed: Oct. 17, 2000

(51) Int. Cl.
*C06Q 30/00* (2006.01)
(52) U.S. Cl. ................ 705/14.4; 705/14.1; 705/18; 705/50; 382/100; 709/217
(58) Field of Classification Search ............ 705/1, 705/10, 14, 14.4, 14.1, 18, 50; 382/100; 709/217
See application file for complete search history.

(56) References Cited

U.S. PATENT DOCUMENTS

| 5,347,632 | A | * | 9/1994 | Filepp et al. ............ 705/14 X |
| 5,550,595 | A | * | 8/1996 | Hannah ................. 348/552 |
| 5,557,721 | A | * | 9/1996 | Fite et al. ............. 705/14 X |
| 5,568,192 | A | * | 10/1996 | Hannah ................. 348/222 |
| 5,717,860 | A | * | 2/1998 | Graber et al. .......... 705/14 X |
| 5,916,024 | A | * | 6/1999 | Von Kohorn ............ 463/40 |
| 5,948,061 | A | * | 9/1999 | Merriman et al. ....... 705/14 X |
| 6,006,197 | A | * | 12/1999 | D'Eon et al. ........... 705/10 |
| 6,173,271 | B1 | * | 1/2001 | Goodman et al. ....... 705/40 |
| 6,216,112 | B1 | * | 4/2001 | Fuller et al. ........... 705/14 |
| 6,311,214 | B1 | * | 10/2001 | Rhoads ................ 709/217 |
| 6,325,420 | B1 | * | 12/2001 | Zhang et al. .......... 283/70 |
| 6,442,285 | B2 | * | 8/2002 | Rhoads et al. ......... 382/100 |
| 6,650,761 | B1 | * | 11/2003 | Rodriguez et al. ...... 382/100 |
| 7,076,432 | B1 | * | 7/2006 | Cheah et al. .......... 704/500 |

OTHER PUBLICATIONS

Harrison, Ann: "Aris says it's on key with digital watermark", MAss High Tech (Watertown, MA, US), V14N26P1-Cambridge, MA, U, New England.*
"Add a Touch of Class to Printed Documents", Baltimore Morning Sun: Jun. 12, 1998.*

* cited by examiner

*Primary Examiner*—Jean Janvier
(74) *Attorney, Agent, or Firm*—Trop, Pruner & Hu, P.C.

(57) ABSTRACT

A system may confirm that advertising was played as originally intended. For example, in one embodiment, a system may determine that an advertisement was played as originally intended and in return, a credit may be provided to the user. This credit may be the ability to play content that the user wishes to play or the credit may be in the form of rewards that are provided to the user, as another example. Thus, the system determines whether the advertisements are played correctly, for example, by detecting watermarks encoded within the advertising, and in return, provides indications that reward the user for playing the advertisement as intended.

13 Claims, 2 Drawing Sheets

ENSURING THAT ADVERTISEMENTS ARE PLAYED

BACKGROUND

This invention relates generally to advertising insertion in audio, video, game, or software content distribution systems.

Systems are available for distributing a wide variety of content to users. In some cases, the users may select a particular content they wish to play. In many cases, it is desirable to insert commercials or advertisements into the content as the content is selected.

In one model, in return for a given number of advertisement viewings, the user may be entitled to play a certain amount of content. Thus, it is important to ensure that the user actually plays the advertising material.

A variety of stripping programs, fast forwarding functions, muting and masking functions are available in digital playback devices. The risk arises for advertisers that the users may avoid actually playing the advertising material in a human understandable way. If the advertising material is never played, it will have no effect.

The net effect of such circumvention may be that free or low cost content may not be made available. In other words, if advertisers cannot be assured that the advertising will actually be played (as opposed to being circumvented), they may be unwilling to subsidize the electronic distribution of content.

Therefore, there is a need for a way to ensure that advertising material inserted in content is actually played as originally designed and intended by the advertiser.

DETAILED DESCRIPTION

Figure 1:
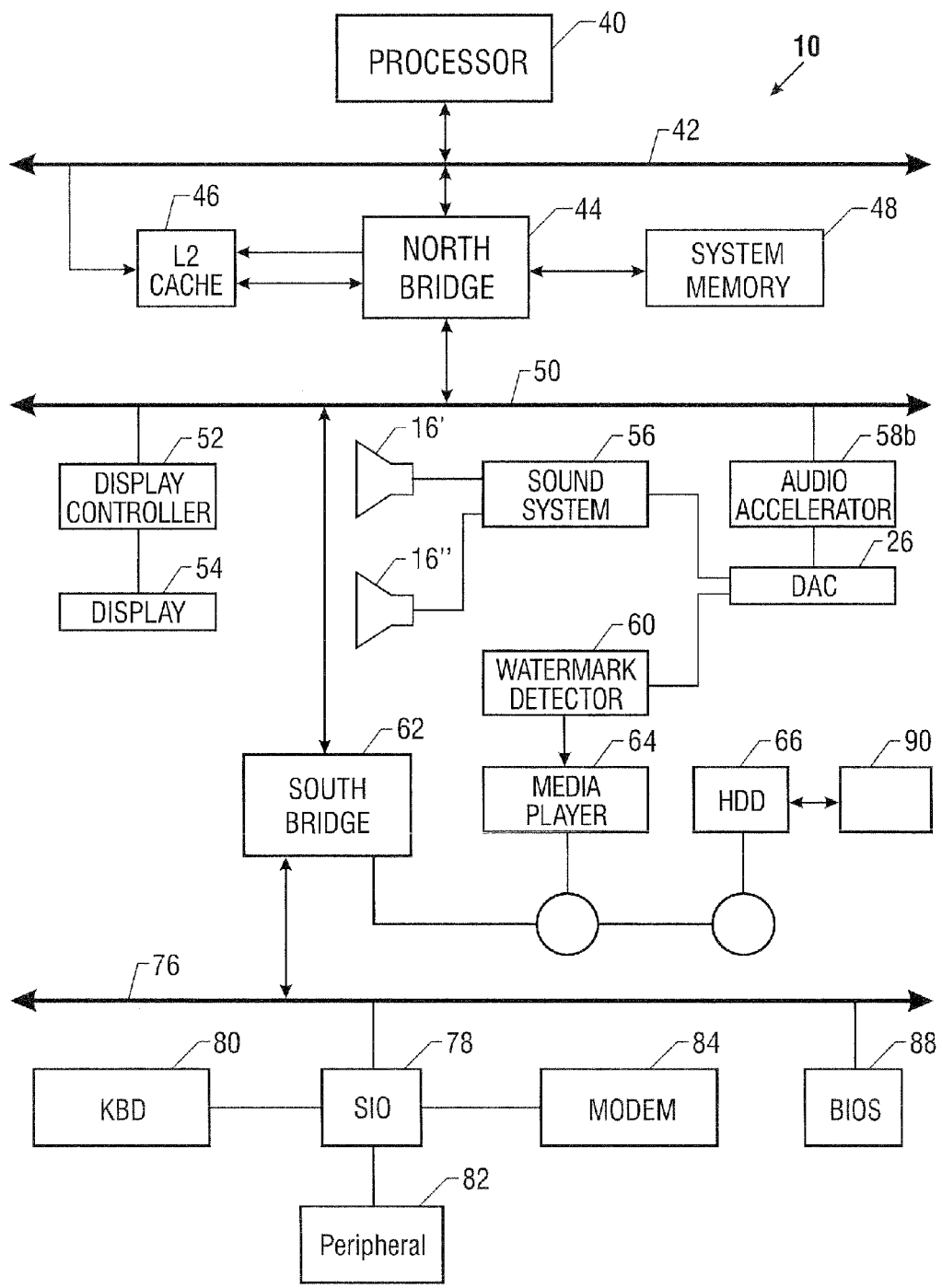
FIG. 1 is a block diagram of one embodiment of the present invention.

Referring to FIG. 1, a processor-based system 10 may include a media player 64 that plays electronic content. Electronic content may include video such as television, audio, games, software, or other media. The media player 64 may be, for example, a compact disk player, a magnetic card reader, an MP-3 player, or a digital video disk player, as examples.

The processor-based system 10 may be a conventional desktop computer system, a set-top box, or a processor-based appliance, as examples. The processor-based system 10 may include the media player 64, a display system 54 for displaying visual material and a sound system 56 for playing audio material.

The processor-based system 10 includes a processor 40 coupled to a host bus 42. The host bus 42 couples a north bridge 44, a system memory 48, and a level two or L2 cache 46.

The north bridge 44 is in turn coupled to a bus 50 that couples to the display 54 through the display controller 52. The display 54 may be a conventional computer monitor or it may be a television receiver, as examples. Also coupled to the bus 50 is an audio accelerator 58b. The audio accelerator 58b is coupled to a digital-to-analog converter 26 that in turn is coupled to the sound system 56. The sound system 56 may include speakers 16' and 16".

Also, coupled to the bus 50 is a south bridge 62. The south bridge 62 is coupled to hubs that in turn couple to the media player 64 and a storage 66 such as a hard disk drive. Software 90 for implementing certain features of one embodiment of the present invention may be stored on the storage 66.

Also coupled to the south bridge 62, is an additional bus 76. The bus 76 is in turn coupled to a serial input/output (SIO) device 78 and a basic input/output system (BIOS) storage 88. The bus 78 may be coupled to a keyboard 80, a modem 84, and other peripheral devices 82, for example, for allowing games to be played.

The modem 84 may allow the processor-based system 10 to be coupled to a content distribution system such as the Internet. In addition, content may be received through airwave broadcasts, satellite systems, or cable television systems, as additional examples. In each case, the content may be provided to the system 10 over any available transport.

Coupled to the digital-to-analog converter 26 is a watermark detector 60. The watermark detector 60 detects whether watermarks present in the content received from a content provider are actually played as intended. For example, the watermark detector 60 may detect whether the watermarked material is played in full at the predetermined play speed and is not otherwise muted, masked, fast-forwarded or stripped from the content. The watermark detector 64 may be coupled to the media player 60 to control the play of content on the media player 64. Thus, content may not be played through the system 10 unless certain advertising material containing a watermark is played as originally intended.

The watermark may be a faint signal that is embedded in the advertising content, that is unstrippable and may not be degraded without degrading the desired content to an unacceptable extent. The faint signal may be designed to be undetectable by users. Watermarks are commonly used with content to protect them from being digitized or re-sampled in the output/analog domain for resubmission to players as "copy always" material. Thus, watermarks are traditionally used to prevent or reveal theft of proprietary material.

These same watermarks may also be detected by the watermark detector 60 to ensure that watermarked advertising material is played as originally intended. Thus, advertising material that includes a watermark with an appropriate security code may be detected by the watermark detector 60. The watermark detector 60 may determine the fidelity of the watermark and the time when the watermark is activated. The detector 60 may ensure that the advertising material is not fast forwarded or otherwise altered.

The watermark detector 60 may directly monitor the video or audio input/output channels to ensure that the channels correctly extract the advertising watermark if, and only if, the advertising is played by the digital output channel at the proper rate and for the duration of the advertising, with no extraneous masking. The extracted advertising security code or watermark is then returned to a media player application to allow decryption of the remaining content by the media player 64.

Alternatively, the watermark may be utilized to accrue digital coupons in return for playing the advertising. That is, instead of only controlling the play of content, the detection of the watermarks in the advertising may also be used to accrue rewards or benefits to users who actually play the advertisements as originally designed.

As still another example, the watermark may be extracted and a security code may be parsed from the watermark. This information may be combined by the processor-based system 10 with an identifier for a particular user. Thus, the advertisement together with the user identifier may be collected for market research purposes.

The watermark detector 60 may be utilized with content that is recorded on a medium such as a magnetic disk as well as content that is received with the watermark over an appropriate distribution network, such as the Internet, or even a television distribution network such as an airwave, cable or satellite network.

Figure 2:
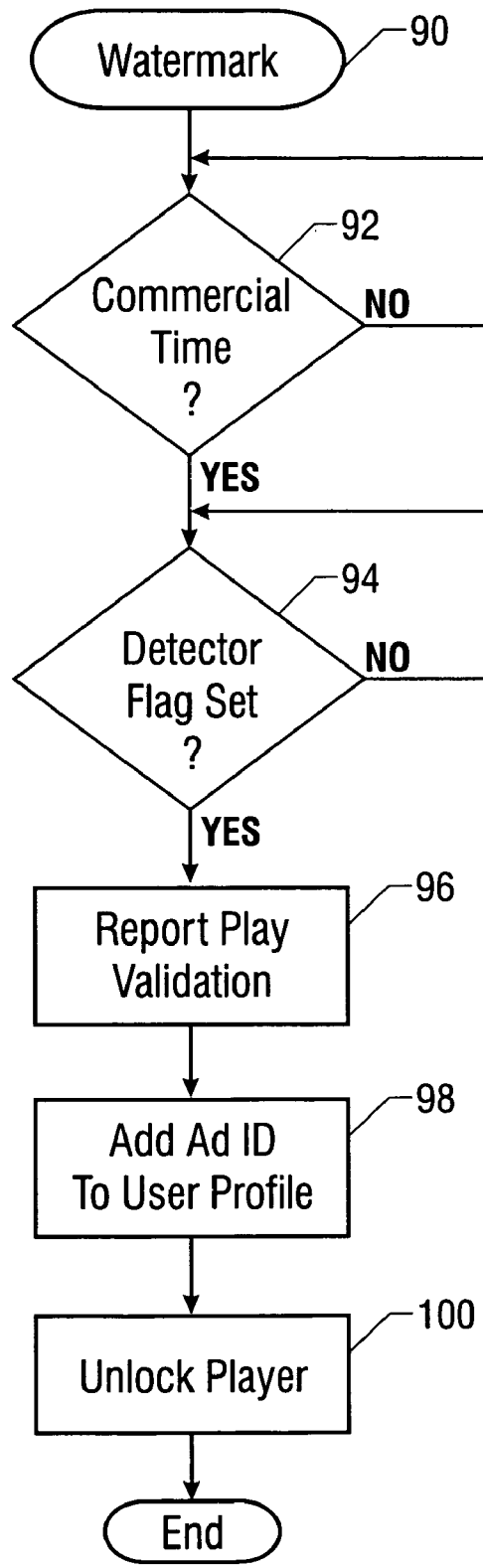
FIG. 2 is a flow chart for software, in accordance with one embodiment of the present invention.

Turning to FIG. 2, the software 90 stored on the storage 66, in accordance with one embodiment of the present invention, may initially determine whether the time for a commercial has arrived, as indicated in diamond 92. In one embodiment, commercials may be inserted at predetermined times. In such case, the software 90 may begin by determining if a commercial insertion time has arrived. In other embodiments in which the commercials are provided automatically, for example, before the content is actually played, the act illustrated by the diamond 92 may be unnecessary.

Once it has been determined that there is reason to monitor the play of a commercial, a check at diamond 94 determines whether the detector flag has been set. The detector flag may be set by the watermark detector 60 when the watermark detector 60 determines that a commercial has been played appropriately. This may include determining whether the commercial is played for the desired amount of time and at the desired speed.

This determination that the commercial was played correctly may be based on stored, predetermined characterizing information for all or a variety of commercials. For example, it may be known that all commercials have a predetermined speed and a predetermined duration. Alternatively, the watermark detector 60 may access a database either on the system 10 or externally thereof to determine the characteristics of a given commercial, for example, in a given piece of content, or at a given time. The watermark detector 60 may then compare that information to what is actually detected through the digital-to-analog converter 26.

In any case, if the detector 60 determines that the advertisement has been correctly played, in one embodiment of the present invention, it may set a flag for the software 90 to detect. When the flag setting is detected, the software 90 reports a play validation as indicated at block 96. In other words, the software 90 may report to external sources that the advertisement was actually played by a given processor-based system 10 as intended. This feedback to the advertiser may provide confirmation that in fact the advertising program is being executed as intended. It may also be utilized to develop statistics in some embodiments.

Next, in some embodiments, the advertisement identifier may be added to a particular user's profile as indicated in block 98. A user profile may be developed for everyone who uses a given processor-based system 10. This profile may be developed by requiring a password to begin using the system 10. As a result, a profile may be developed indicating which commercials are viewed by particular users.

This user profile information may be utilized to award credits, points, or rewards to particular users based on their commercial viewing practices. In addition, the profile may be provided to marketing operations for targeted advertisements for particular users.

Next, the media player 64 may be unlocked as indicated in block 100. In one embodiment, this may mean that a key is provided for decrypting encrypted content and allowing the play of that content in return for having watched a commercial. As another example, the media player 64 may be allowed to actually operate to play the rest of the content. In still another embodiment, the system 10 either decrypts or allows the play of content received from an external source.

While the present invention has been described with respect to a limited number of embodiments, those skilled in the art will appreciate numerous modifications and variations therefrom. It is intended that the appended claims cover all such modifications and variations as fall within the true spirit and scope of this present invention.

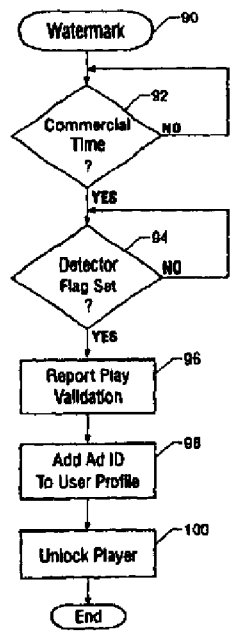

What is claimed is:

1. A system comprising:
   a processor-based device;
   a media player coupled to said processor-based device; and
   a watermark detector coupled to said media player, said watermark detector to detect a watermark included with an advertisement and to control operation of said media player in response to detection of the watermark.

2. The system of claim 1 further including a storage coupled to said device, said storage storing instructions that, if executed, enable the processor-based device to monitor the watermark included with the advertisement and accrue a credit after determining the advertisement was played.

3. The system of claim 2 wherein said storage stores instructions that, if executed, enable the device to allow access to content through said media player.

4. The system of claim 2 wherein said storage stores instructions that, if executed, enable the device to accrue a reward in return for playing the advertisement.

5. The system of claim 1 wherein said watermark detector determines whether an advertisement was played at a predetermined speed.

6. The system of claim 1 wherein said storage stores content for subsequent replay by said media player.

7. The method of claim 1 including determining that the advertisement was played, based on the watermark.

8. The article of claim 1 storing instructions that, if executed, enable the processor-based device to determine that the advertisement was played, based on the watermark.

9. A method comprising:
   monitoring a watermark included with an advertisement;
   accruing a credit after determining that the advertisement was played; and
   controlling operation of a media player in response to monitoring the watermark.

10. An article comprising:
    a medium storing instructions that, if executed, enable a processor-based system to:
    monitor a watermark included with an advertisement;
    accrue a credit after determining that the advertisement was played; and
    control operation of a media player in response to monitoring the watermark.

11. The article of claim 10, said medium storing instructions to control the media player to play content based on said credit and to use said watermark to accrue said credit.

12. The method of claim 9 including controlling operation of the media player to play content based on said credit and to use said watermark to accrue said credit.

13. The system of claim 1, said watermark detector to accrue a credit based on detection that the advertisement control operation of said media player was played and content based on said credit.

* * * * *

UNITED STATES PATENT AND TRADEMARK OFFICE
CERTIFICATE OF CORRECTION

PATENT NO.        : 7,761,327 B1                                                         Page 1 of 1
APPLICATION NO.   : 09/690512
DATED             : July 20, 2010
INVENTOR(S)       : Eric C. Hannah et al.

It is certified that error appears in the above-identified patent and that said Letters Patent is hereby corrected as shown below:

Column 4:
Claims 7 and 8 should be canceled.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,761,327 B1
APPLICATION NO.   : 09/690512
DATED             : July 20, 2010
INVENTOR(S)       : Eric C. Hannah et al.

It is certified that error appears in the above-identified patent and that said Letters Patent is hereby corrected as shown below:

Delete the title page and substitute therefore the attached title page showing the corrected number of claims in printed patent.

Column 4:
Claims 7 and 8 should be canceled.

This certificate supersedes the Certificate of Correction issued November 16, 2010.

Signed and Sealed this

Twenty-first Day of December, 2010

David J. Kappos
*Director of the United States Patent and Trademark Office*

(12) United States Patent
Hannah et al.

(10) Patent No.: US 7,761,327 B1
(45) Date of Patent: Jul. 20, 2010

(54) ENSURING THAT ADVERTISEMENTS ARE PLAYED

(75) Inventors: Eric C. Hannah, Pebble Beach, CA (US); Michael Boyd, Lakeport, CA (US)

(73) Assignee: Intel Corporation, Santa Clara, CA (US)

( * ) Notice: Subject to any disclaimer, the term of this patent is extended or adjusted under 35 U.S.C. 154(b) by 2453 days.

(21) Appl. No.: 09/690,512

(22) Filed: Oct. 17, 2000

(51) Int. Cl.
*C06Q 30/00* (2006.01)

(52) U.S. Cl. ......... 705/14.4; 705/14.1; 705/18; 705/50; 382/100; 709/217

(58) Field of Classification Search ............ 705/1, 705/10, 14, 14.4, 14.1, 18, 50; 382/100; 709/217
See application file for complete search history.

(56) References Cited

U.S. PATENT DOCUMENTS

| | | | | |
|---|---|---|---|---|
| 5,347,632 | A | * | 9/1994 | Filepp et al. ............ 705/14 X |
| 5,550,595 | A | * | 8/1996 | Hannah .................... 348/552 |
| 5,557,721 | A | * | 9/1996 | Fite et al. ............... 705/14 X |
| 5,568,192 | A | * | 10/1996 | Hannah .................... 348/222 |
| 5,717,860 | A | * | 2/1998 | Graber et al. ........... 705/14 X |
| 5,916,024 | A | * | 6/1999 | Von Kohorn ............... 463/40 |
| 5,948,061 | A | * | 9/1999 | Merriman et al. ....... 705/14 X |
| 6,006,197 | A | * | 12/1999 | D'Eon et al. .............. 705/10 |
| 6,173,271 | B1 | * | 1/2001 | Goodman et al. .......... 705/40 |
| 6,216,112 | B1 | * | 4/2001 | Fuller et al. ............... 705/14 |
| 6,311,214 | B1 | * | 10/2001 | Rhoads ................... 709/217 |
| 6,325,420 | B1 | * | 12/2001 | Zhang et al. ............... 283/70 |
| 6,442,285 | B2 | * | 8/2002 | Rhoads et al. ........... 382/100 |
| 6,650,761 | B1 | * | 11/2003 | Rodriguez et al. ...... 382/100 |
| 7,076,432 | B1 | * | 7/2006 | Cheah et al. ............. 704/500 |

OTHER PUBLICATIONS

Harrison, Ann: "Aris says it's on key with digital watermark", MAss High Tech (Watertown, MA, US), V 14N26P1-Cambridge, MA, U. New England.*
"Add a Touch of Class to Printed Documents", Baltimore Morning Sun: Jun. 12, 1998.*

* cited by examiner

*Primary Examiner*—Jean Janvier
(74) *Attorney, Agent, or Firm*—Trop, Pruner & Hu, P.C.

(57) ABSTRACT

A system may confirm that advertising was played as originally intended. For example, in one embodiment, a system may determine that an advertisement was played as originally intended and in return, a credit may be provided to the user. This credit may be the ability to play content that the user wishes to play or the credit may be in the form of rewards that are provided to the user, as another example. Thus, the system determines whether the advertisements are played correctly, for example, by detecting watermarks encoded within the advertising, and in return, provides indications that reward the user for playing the advertisement as intended.

11 Claims, 2 Drawing Sheets